US012798891B2

(12) United States Patent
Folger et al.

(10) Patent No.: US 12,798,891 B2
(45) Date of Patent: Nov. 17, 2026

(54) STACKING STATION AND STACKING METHOD FOR THE BATTERY CELL-PRODUCING INDUSTRY

(71) Applicant: KÖRBER TECHNOLOGIES GMBH, Hamburg (DE)

(72) Inventors: Manfred Folger, Hamburg (DE); Jan Kreysern, Hamburg (DE); Marcus Wagner, Hamburg (DE); Michael Kleine Wächter, Lankau (DE); Karsten Meinke, Mölln (DE); Nils Hofmann, Ottersberg (DE); Nils Klaper, Drage (DE); Patrick Gögel, Hamburg (DE)

(73) Assignee: KÖRBER TECHNOLOGIES GMBH, Hamburg (DE)

( * ) Notice: Subject to any disclaimer, the term of this patent is extended or adjusted under 35 U.S.C. 154(b) by 0 days.

(21) Appl. No.: 18/845,773

(22) PCT Filed: Mar. 10, 2023

(86) PCT No.: PCT/EP2023/056175
§ 371 (c)(1),
(2) Date: Sep. 10, 2024

(87) PCT Pub. No.: WO2023/174821
PCT Pub. Date: Sep. 21, 2023

(65) Prior Publication Data

US 2025/0197126 A1 Jun. 19, 2025

(30) Foreign Application Priority Data

Mar. 14, 2022 (DE) ..................... 10 2022 105 874.3

(51) Int. Cl.
*B65G 43/08* (2006.01)
*B65G 57/04* (2006.01)
(Continued)

(52) U.S. Cl.
CPC ............. *B65G 43/08* (2013.01); *B65G 57/04* (2013.01); *G01B 11/26* (2013.01);
(Continued)

(58) Field of Classification Search
CPC ............................... B65G 43/08; B65G 57/04; B65G 2203/0233; B65G 2203/041; G01B 11/26;
(Continued)

(56) References Cited

U.S. PATENT DOCUMENTS 6,793,217 B2 * 9/2004 Gronbjerg .............. B65H 29/32 271/197
6,817,829 B2 * 11/2004 Kameda ................. B65G 61/00 414/789.6

(Continued)

FOREIGN PATENT DOCUMENTS

DE 10 2017 216 158 A1 3/2019
EP 2 030 924 A1 3/2009

(Continued)

*Primary Examiner* — Saul Rodriguez
(74) *Attorney, Agent, or Firm* — SALIWANCHIK, LLOYD & EISENSCHENK

(57) ABSTRACT

The invention relates to a stacking station for the battery cell-producing industry, comprising a conveyor device for conveying flat elements and a stacking device arranged downstream of the conveyor device for forming a segment stack from conveyed flat elements. The stacking station has an optical measuring device which is arranged in a measurement relationship with the conveyor device and is designed to detect a position deviation ΔR, ΔS and/or an angle offset φ of a flat element being conveyed on the conveyor device.

10 Claims, 4 Drawing Sheets

(51) Int. Cl.
*G01B 11/26* (2006.01)
*H01M 10/04* (2006.01)

(52) U.S. Cl.
CPC . *H01M 10/0404* (2013.01); *B65G 2203/0233* (2013.01); *B65G 2203/041* (2013.01)

(58) Field of Classification Search
CPC ........... H01M 10/0404; B65H 2406/33; B65H 2406/345; B65H 2511/24; B65H 2553/40; B65H 2801/72; B65H 31/34; B65H 43/04; B65H 43/08; B65H 29/241; Y02E 60/10; Y02P 70/50
See application file for complete search history.

(56) References Cited

U.S. PATENT DOCUMENTS

| | | | | |
|---|---|---|---|---|
| 8,790,064 | B2 * | 7/2014 | Dorner | B21D 43/003 901/7 |
| 9,028,566 | B2 | 5/2015 | Hood | |
| 10,581,108 | B2 * | 3/2020 | Sakurai | H01M 10/0404 |
| 12,398,007 | B2 * | 8/2025 | Abe | B65H 31/34 |
| 2009/0057993 | A1 | 3/2009 | Zancanaro | |
| 2014/0026398 | A1 * | 1/2014 | Watanabe | H01M 10/052 29/730 |
| 2014/0056684 | A1 * | 2/2014 | Sydorko | B65G 59/106 414/795.6 |
| 2016/0339595 | A1 | 11/2016 | Mccabe et al. | |
| 2020/0067051 | A1 | 2/2020 | Yamashita et al. | |
| 2021/0184240 | A1 | 6/2021 | Yamashita | |
| 2021/0257653 | A1 * | 8/2021 | Ono | H01M 10/0404 |
| 2022/0045312 | A1 | 2/2022 | Sauer et al. | |
| 2022/0190391 | A1 | 6/2022 | Inagaki et al. | |

FOREIGN PATENT DOCUMENTS

| | | | |
|---|---|---|---|
| EP | 2 696 421 | A1 | 2/2014 |
| WO | WO 2020/203112 | A1 | 10/2020 |

* cited by examiner

STACKING STATION AND STACKING METHOD FOR THE BATTERY CELL-PRODUCING INDUSTRY

CROSS REFERENCE TO RELATED APPLICATIONS

This application is a National Stage Application of International Application Number PCT/EP2023/056175, filed Mar. 10, 2023; which claims priority to German Patent Application No. 10 2022 105 874.3, filed Mar. 14, 2022.

FIELD OF THE INVENTION

The present invention relates to a stacking station for the battery cell-producing industry, comprising a conveyor device for conveying flat elements and a stacking device arranged downstream of the conveyor device for forming a segment stack from the conveyed flat elements. The invention further relates to a corresponding stacking method.

BACKGROUND OF THE INVENTION

A major challenge when stacking monocells, electrodes or separator portions, or, generally, flat elements, in battery cell production is the positioning accuracy of the individual portions or segments. All deviations from previous processes are factors in the stacking accuracy. The given tolerance is best utilised when the individual layers, i.e. segments, are positioned centre to centre. The separators are relatively soft. Therefore, they cannot be positioned to the stop. Alignment at the edges of the separators using an alignment surface is not possible and is not optimal for utilizing the tolerance. A method must be used with which the portions/segments can be positioned as close to the centre as possible.

EP 2 696 421 A1 discloses a stacking station that operates discontinuously by means of a so-called pick-and-place method. This allows the portions/segments to be positioned in the centre, but the production speed of such systems is limited due to the discontinuous operation.

BRIEF SUMMARY OF THE INVENTION

The object of the invention is to provide a stacking station and a stacking method in which predetermined requirements for stacking accuracy can be met without compromising production speed.

The invention achieves this object by the features of the independent claims.

DETAILED DESCRIPTION

In accordance with the invention, the stacking station has an optical measuring device which is arranged in a measurement relationship with the conveyor device and is designed to detect a position deviation and/or an angle offset of a flat element being conveyed on the conveyor device. A measurement signal output by the measuring device can serve as a basis for carrying out an appropriate measure if a deviation of the position or orientation of a flat element from a target position or target orientation is determined.

Preferably, the conveyor device is arranged immediately upstream of the stacking device, i.e. advantageously no further conveyor apparatuses are provided between the conveyor device and the stacking device. In this way, the flat elements to be stacked can be aligned as late as possible, i.e. only during or immediately before stacking, and all previously occurring deviations can be corrected. The positions of the flat elements can be corrected in a relatively simple manner with little effort in the last possible process step. This corrects errors from previous process steps. Preferably, measuring methods that do not require excessive precision can be used or the design of the measuring device can be selected to be relatively simple, which reduces the cost of the machine.

In an advantageous embodiment, the conveyor device can be a rotary conveyor, for example a conveyor drum, in particular an accelerator drum. In order to avoid uncontrolled movements, the portions are advantageously held constantly and free movements are avoided. This prevents shifting during stacking.

Preferably, the conveyor device and/or the stacking device is designed to carry out a position correction of a flat element on the basis of a measurement signal output by the measuring device. In this way, it can be ensured that the segments are placed centrally on the segment stack, or generally without deviation from a target position/orientation.

In an advantageous embodiment, a position correction of a flat element along the conveying direction is carried out by controlled adjustment of the delivery position of the flat element from the conveyor device. This can be done particularly easily by means of a position-controlled drive of the conveyor device, such as a synchronous motor. If the conveyor device advantageously has a position-controlled drive already, no additional means are required for correcting the segment position in the conveying direction.

In one embodiment of the invention, in order to carry out a position correction of a flat element, at least one receptacle of the conveyor device for receiving a flat element is adjustable and/or rotatable in a controlled manner relative to a main body of the conveyor device. This has the advantage that only a relatively small mass needs to be moved.

In another embodiment, in order to carry out a position and/or angle correction, a rotating part of the conveyor device, such as a conveyor drum, is adjustable and/or rotatable as a whole.

In a further embodiment, at least one element receptacle of the stacking device is adjustable and/or rotatable in order to carry out a position and/or angle correction.

The invention is not limited to the previously described position and/or angle correction of an incorrectly positioned/oriented flat element. It is also conceivable, for example, to remove an incorrectly positioned/oriented flat element from the product stream and/or to issue a warning signal to a display device, such as an operating terminal.

Preferably, the optical measuring device has an imaging measuring apparatus, in particular a camera. By means of an optical measuring apparatus looking at the conveyor device and a corresponding image evaluation in a control/evaluation unit, all desired deviations and angle errors can be determined in a simple manner. In this embodiment, the imaging measuring apparatus is advantageously designed to capture images during standstill phases of the conveyor device, which allows for greater measurement accuracy. However, it is also possible to take measurements while the conveyor device is moving.

In another embodiment, or in addition to the imaging measuring apparatus, the optical measuring device preferably has at least one optical contrast sensor. By means of a simple and comparatively inexpensive optical contrast sensor, an optical transition generated by a transverse edge of a flat element as a result of the conveying, i.e. a light-dark transition or a colour transition as a sharp signal edge, and thus the position of the flat element along the conveying direction can be reliably determined.

Preferably, the optical measuring device has a plurality of optical contrast sensors which are arranged transversely to a conveying direction of the conveyor device. This makes it easy to determine an angle offset of a flat element by trigonometrically evaluating an offset of the signal edges of the sensors in the conveying direction.

The optical measuring device advantageously has at least one laterally arranged optical sensor which is designed to detect a deviation of a position of a flat element being conveyed on the conveyor device from a target position in a transverse direction. This is particularly advantageous when a lateral offset of a flat element cannot be determined with the optical contrast sensors described above.

In accordance with a further aspect, the invention provides a stacking method for the battery cell-producing industry, comprising conveying flat elements by means of a conveyor device and forming a segment stack from the conveyed flat elements by means of a stacking device arranged downstream of the conveyor device. In accordance with the invention, an optical measurement is carried out by means of an optical measuring device which is arranged in a measurement relationship with the conveyor device, and a position deviation and/or an angle offset of a flat element being conveyed on the conveyor device is detected by means of the optical measurement.

In accordance with the above, optical sensors, for example a camera and/or at least one optical contrast sensor, detect the position of the flat elements on the conveyor device. In the case of optical contrast sensors, this takes place in principle while the conveyor device is moving. In the case of a camera, this can take place while the conveyor device is moving or at a standstill. A control/evaluation unit then determines the deviation of the actual position measured by the measuring device from a target position. From this deviation, a relative positioning correction between the receptacles of the conveyor device and the stacking device can be derived and carried out. Additional optical sensors can be used to advantageously measure the final placement accuracy of the stack.

The individual position of the flat element is detected while the flat element is being moved by the conveyor device towards an element receptacle of the stacking device. The optical sensors always scan the position of the flat element at the same point. Different types of sensors are conceivable. An imaging measuring apparatus is suitable for detecting the exact position and also identifying an angle error. By means of optical contrast sensors, various measurement variables can be detected, in particular by arranging a plurality of sensors along a transverse direction.

BRIEF DESCRIPTION OF THE FIGURES

The invention is explained below using preferred embodiments with reference to the accompanying drawings. In the drawings.

Figure 1:
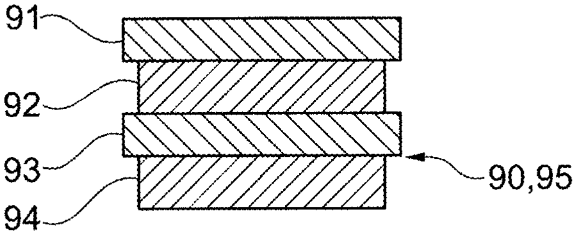
FIG. 1 is a schematic side view of a flat element in the form of a separator-electrode composite unit.

To produce battery cells, flat elements 95, for example electrode-separator composite units 90, are produced and then stacked to form a cell stack. The separator-electrode composite units 90 consist of alternating layers of flat elements 91-94, namely separator sheet 91, anode 92, separator sheet 93 and cathode 94. The order of the individual layers 91-94 can vary; in particular, it is possible to swap anode 92 and cathode 94. The electrode-separator composite unit 90 can be a monocell with four individual layers 91-94, as shown in FIG. 1. The electrode-separator composite unit 90 can have more or fewer than four individual layers 91-94, for example a multiple of four. In other embodiments, the flat elements 95 to be stacked in the stacking station 50 can also be individual sheets, i.e. individual separator sheets 91, 93 and individual electrode sheets 92, 94. To complete the stack, an electrode-separator composite unit with a different number of individual layers, for example three, can be placed on top.

The electrodes 92, 94 each have a contact tab 96 (see FIG. 4) with which all electrodes 92, 94 of one type in the final cell stack can come into contact with one another. The contact tabs 96 of the anodes 92 and the contact tabs 96 of the cathodes 94 can be arranged on the same side or on opposite sides of the composite element 90.

Figure 2:
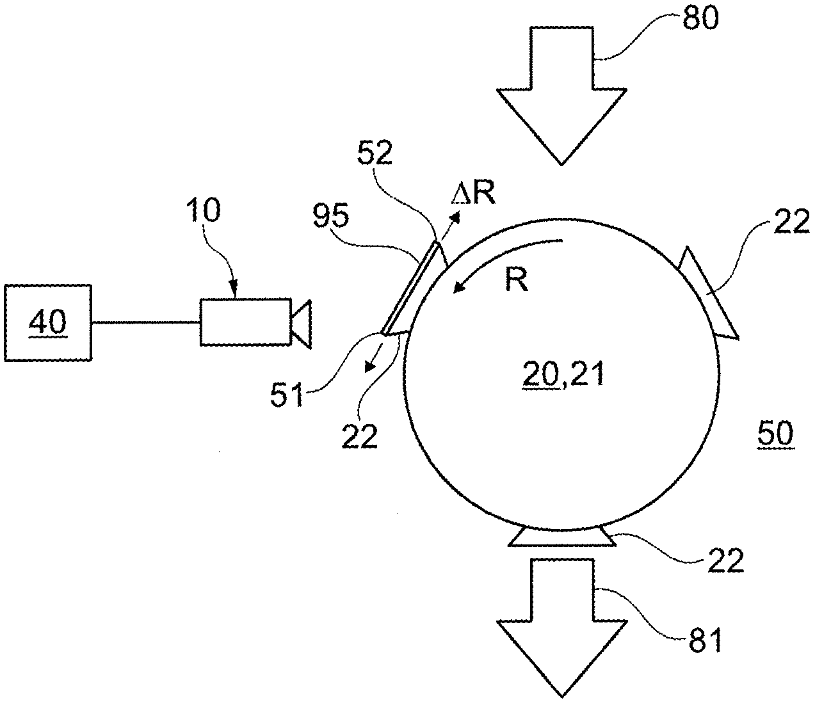
FIG. 2 is a schematic view of a rotary conveyor with a measuring device.
Figure 3:
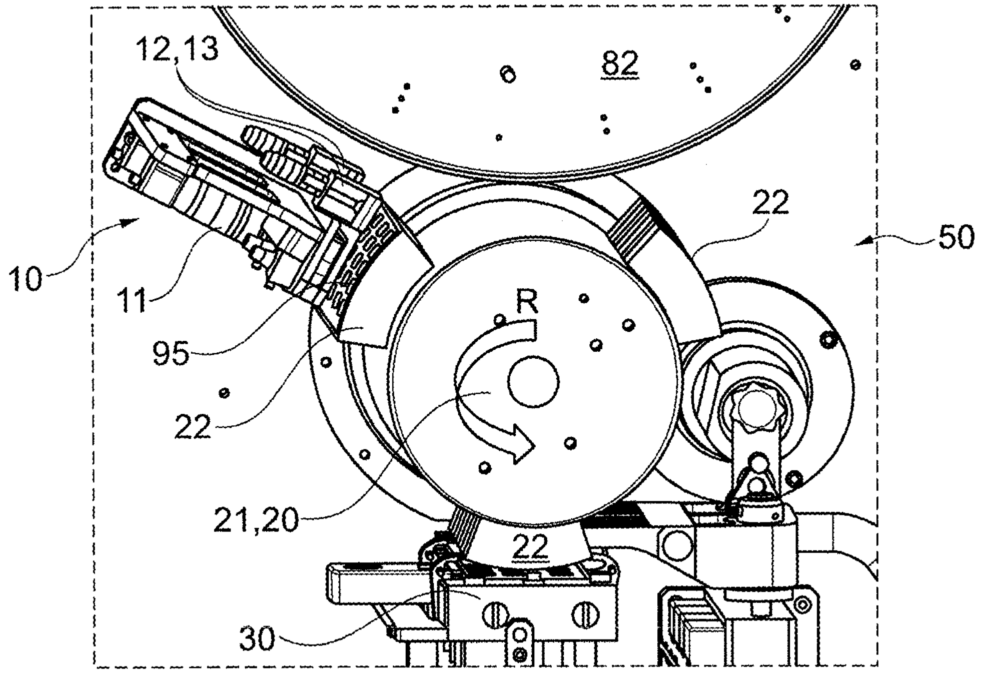
FIG. 3 is a perspective view of a stacking station with a rotary conveyor and a measuring device.

A stacking station 50 for stacking the flat elements 95 to form a cell stack comprises a conveyor device 20, a measuring device 10 for measuring properties of flat elements 95 being conveyed on the conveyor device 20 and a stacking device 30 arranged downstream of the conveyor device 20; see FIGS. 2 and 3. Preferably, the conveyor device 20 is arranged immediately upstream of the stacking device 30, i.e. advantageously no further conveyor apparatus is provided between the conveyor device 20 and the stacking device 30. The conveyor device 20 is advantageously the last conveyor device or conveyor drum in the production stream on which the flat elements 95 are transported individually. In the embodiments described here, the conveyor device 20 is advantageously a rotary conveyor 21 driven to rotate in a rotation direction R, in other words a conveyor drum. However, the conveyor device 20 can also be designed as a belt conveyor.

Flat elements 95 are transferred from an upstream conveyor 82, for example a conveyor drum (see FIG. 3), to the rotary conveyor 21 (product stream 80) at a defined circumferential position, here at 12 o'clock, for example, conveyed in the rotation direction R, and delivered again at a defined circumferential position, here for example at 6 o'clock (product stream 81), in particular to the stacking device 30 arranged downstream. The conveyor device 20 holds the flat elements 95 during conveying, for example by means of a vacuum, and can have receptacles 22 for receiving the flat elements 95. The number of receptacles 22 in this case is three, but can also be more or less than three.

The measuring device 10 is arranged in a measurement relationship with the conveyor device 20 and is designed for optical measurement of flat elements 95 being conveyed on the conveyor device 20. The measuring device 10 comprises at least one optical sensor 11-13, which is arranged facing the outer surface of the rotary conveyor 21, i.e. on an object plane of the composite elements 90. The measuring device 10 advantageously comprises a camera 11 looking at the outer surface of the rotary conveyor 21 and/or at least one optical contrast sensor 12, 13. The at least one optical sensor 11-13 is designed to detect at least one offset of a flat element 95 on the conveyor device 20. An offset means the deviation of a measured position or orientation from a target position or orientation. The corresponding signal and data processing as well as evaluation of the measurement signal from the measuring device takes place in an electronic control and evaluation unit 40, which is shown schematically in FIG. 2. The electronic control and evaluation unit 40 can be implemented in particular in a machine controller or in a separate data processing unit.

The measuring device 10 is advantageously designed to determine an offset ΔR of a flat element 95 along the conveying direction F of the conveyor device 20, here along the rotation direction R of the rotary conveyor 21. The measuring device 10 is advantageously designed to determine an offset ΔS of a flat element 95 transversely to the conveying direction F of the conveyor device 20, here transversely to the rotation direction R of the rotary conveyor 21. The measuring device 10 is advantageously designed to determine a rotation of a flat element 95 by an angle φ about an axis perpendicular to a conveying plane, here about a radial axis of the rotary conveyor.

With a camera 11, the deviation ΔR, ΔS and/or the angle offset φ can be easily determined by means of image processing in the electronic control and evaluation unit 40.

In the embodiment in accordance with FIG. 3, the rotary conveyor 21 is designed as a so-called accelerator drum. This means that the rotary conveyor 21 does not rotate at a constant rotation speed, but is periodically braked and accelerated again. In particular, the rotary conveyor 21 can preferably come to a standstill at the delivery position of the flat elements 95, here at 6 o'clock, in order to deliver the flat elements 95 to the stacking station 50 in a precise position. In such an embodiment, the control/evaluation unit 40 advantageously synchronises the camera 11, or an imaging optical sensor of the measuring device 10, such that the image is captured at the time when the rotary conveyor 21 is at a standstill. The angle distance between the camera 11 and the delivery position (here 6 o'clock) advantageously corresponds to the angle distance between two receptacles 22, so that when the rotary conveyor 21 is at a standstill, a flat element 95 is positioned in the field of view of the camera 11. It is possible to capture images while the rotary conveyor 21 is rotating.

By means of at least one optical contrast sensor 12, 13, the deviation ΔR can first be determined as follows. The at least one optical contrast sensor 12, 13 is designed to determine an optical transition generated by a transverse edge 51, 52 of a flat element 95 conveyed past the optical contrast sensor 12, 13. A transverse edge 51, 52 is an edge of the flat element 95 that runs transversely to the conveying or rotation direction, in particular a front edge 51 and/or a rear edge 52. An optical transition is a light-dark transition or a colour transition. When an optical transition is detected by a transverse edge 51, 52 of a flat element 95 being conveyed past, the optical contrast sensor 12, 13 generates a sharp signal edge that reflects the exact position of the transverse edge 51, 52, and thus of the flat element 95, along the conveying or rotation direction. In this way, an offset ΔR (symbolised by arrows) of the flat elements 95 in the circumferential direction of the rotary conveyor 21 can be determined and advantageously compensated for by regulating the rotary conveyor 21 (this is explained in more detail below). The optical contrast sensor 12, 13 can, for example, be a fast-switching contrast light sensor. In the case of a plurality of optical contrast sensors 12, 13 arranged transversely to the conveying or rotation direction, for example, the mean value of the position of the optical transition can be determined as the actual value of the transverse edge 51, 52.

Figure 4:
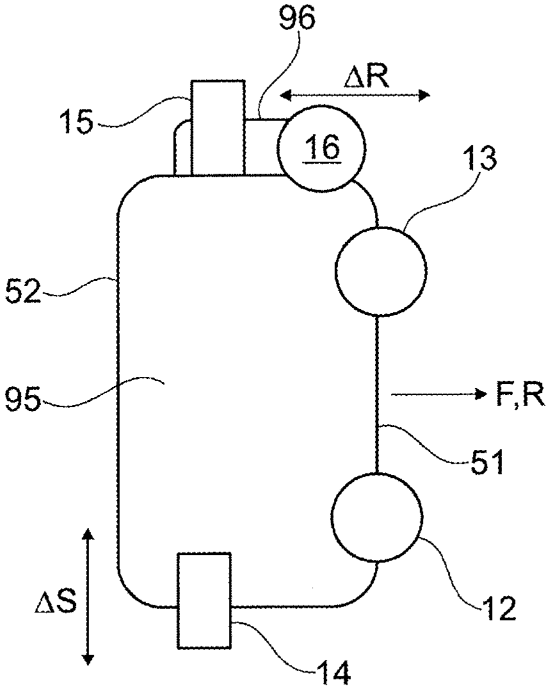
FIG. 4 is a schematic plan view of a flat element in the region of the measuring device.
Figure 5:
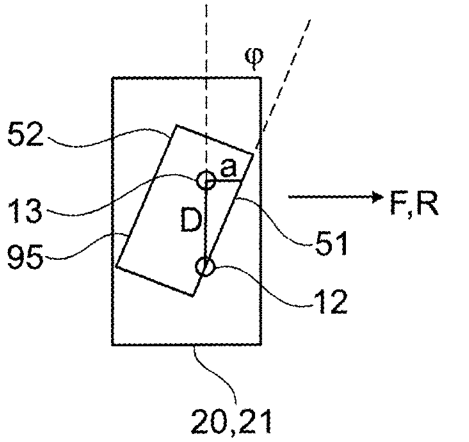
FIG. 5 is a schematic plan view of a flat element with an angle offset in the region of the measuring device.

Preferably, a plurality of optical contrast sensors 12, 13 are provided at the same position in the conveying direction, which are spaced apart by a distance D in the transverse direction; see FIGS. 4 and 5. With a plurality of spaced-apart optical contrast sensors 12, 13 at the same position in the conveying direction, the angle orientation and thus an undesired rotation of the flat elements 95 about an axis perpendicular to the conveying plane, for example about a radial axis of the rotary conveyor 21, can be determined in the control and evaluation unit 40. This is explained below with reference to FIG. 5.

In this example, the optical sensor 13 detects the front edge 51 of the flat element 95 first and the optical sensor 12 detects the front edge 51 of the flat element 95 thereafter with a time delay Δt. The offset a in the conveying direction results from the known conveying speed v or the machine cycle as $a=v\cdot\Delta t$. The angle offset φ results from a trigonometric evaluation of the ratio of a to D: $\tan(\varphi)=a/D$. By forming the arctangent, the angle offset φ is obtained as follows: $\varphi=\arctan(a/D)$.

The optical sensors 12, 13 are therefore advantageously contrast light sensors which detect the passing movement of a flat element 95. Depending on the triggering pattern, it can be determined whether the flat element 95 is guided exactly parallel (both light sensors 12, 13 trigger simultaneously) or whether the flat element 95 has an angle error φ. The absolute time in relation to the absolute position of the drive of the conveyor device can be used to determine the position and the offset ΔR along the conveying direction. By means of a corresponding offset during delivery to the stacking device 30, a detected error can be corrected and the placement position can be adjusted.

The lateral offset ΔS cannot be determined with the optical contrast sensors 12, 13. To determine the lateral offset ΔS, the measuring device 10 can have further optical sensors 14, 15 (see FIG. 4) which are arranged laterally to the flat elements 95. The optical sensors 14, 15 can, for example, be reflection sensors with light lines, which can determine how far the flat elements 95 are offset transversely to the conveying direction F by measuring the amount of light. The optical sensors 14, 15 can be distance sensors which are designed to measure the lateral distance, and thus the transverse offset, of the flat elements 95. Alternatively, point or line measuring laser scanners can be used which work with triangulation or time-of-flight measurement (lidar). Depending on the embodiment, it may be sufficient to provide such a distance sensor 14 or 15 only on one side of the conveyor device 20.

A transverse offset can therefore be detected by the optical sensors 14, 15. A reflection principle with light lines can be used here, which can determine how far the flat element is offset laterally from the central axis by measuring the amount of light. Analogous to the previously described compensation of the longitudinal offset, the transverse offset can be corrected using suitable actuators. Following the same pattern, an angle error can also be corrected by adding a rotating or at least tilting movement component.

Optionally, at least one further optical sensor 16 is provided for determining the position of a contact tab 96 of the electrodes 92, 94 in the conveying direction. The distance between the optical sensor 16 and the sensors 12, 13 in the conveying direction is advantageously smaller than the extension of a flat element 95 in the conveying direction and can correspond approximately to the distance between the transverse edge 51 and the front edge of the contact tab 96. A time difference indicates an offset of the contact tab 96 to the edge 70 of the flat elements 95 in the conveying direction.

The further optical sensor 16 allows a determination of the position of each contact tab 96 relative to a transverse edge 51, 52 of the corresponding flat element 95. This information is useful because the position of the contact tab 96 relative to the main body of the corresponding electrode 92, 94 may vary. For example, the measurement signals of the sensors 12, 13 can be compensated for with this information so that the sensors 12, 13 do not falsely indicate an offset of the electrodes 92, 94 which is actually based on an offset of a contact tab 96 relative to the main body of the corresponding electrode 92, 94. The additional optical sensor 16 generally represents optional additional features of the flat element, which may also be detected, such as an outgoing conductor lug or contact tab 96.

If the control/evaluation unit 40 detects an offset ΔR, an offset ΔS and/or an angle error φ of a flat element 95, the control/evaluation unit 40 can automatically initiate suitable measures. This will be explained in more detail below.

If the control/evaluation unit 40 detects an offset ΔR of a flat element 95 along the conveying direction F or the rotation direction R, this can advantageously be compensated for by controlling a position-controlled drive for the rotary conveyor 21 by varying the delivery position for the flat elements 95 and selecting it accordingly. If 12 o'clock is 0°, 6 o'clock is 180° and 9 o'clock is 90°, then the delivery position does not have to be exactly 180° in every case, but can vary slightly by a few tenths of a degree around 180°. If, for example, a flat element 95 leads in the conveying direction, the delivery position in FIG. 2 would be slightly smaller than 180°. If, for example, a flat element 95 trails in the conveying direction, the delivery position in FIG. 2 would be slightly larger than 180°. In this way, a precise positioning on the stack in the stacking station 50 can be ensured without offset ΔR along the conveying direction.

In the embodiment described above, the stop position of the rotary conveyor 21 for the transfer of the flat element 95 to the stacking device 30 is therefore selected such that the deviation ΔR in the transport or conveying direction F is corrected.

Figure 6:
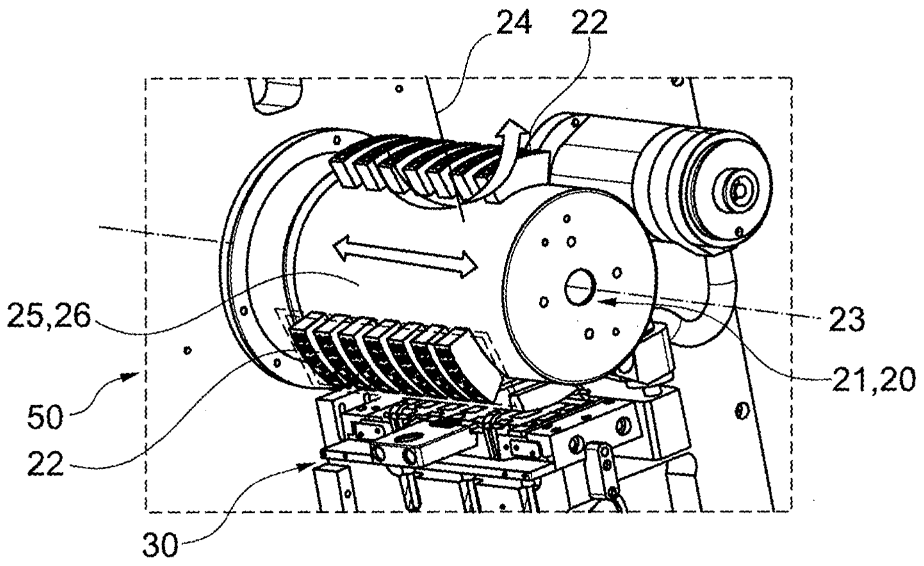
FIG. 6, 7 are perspective views of a stacking station in different embodiments.

In the embodiment in accordance with FIG. 6, a rotating body 25 of the rotary conveyor 21, more generally a rotating part 26 of the conveyor device 20, is displaceable as a whole along a transverse axis 23, for example the axis of rotation of the rotary conveyor 21 (which is indicated by a double arrow) in order to compensate for an offset ΔS of a flat element 95 in the transverse direction, and/or pivotable about a pivot axis 24 perpendicular to the conveying plane in order to compensate for an angle offset φ of a flat element 95. For this purpose, the conveyor device 20 or the rotary conveyor 21 has a displacement and/or pivoting mechanism (not shown) which is controlled accordingly by the control/evaluation unit 40 in order to effect a displacement and/or pivoting.

In this embodiment, the rotating body 25, here the accelerator drum, can therefore be axially displaced as a whole. In addition, the rotating body 25 can be rotated about a radial axis to correct angle errors.

Figure 7:
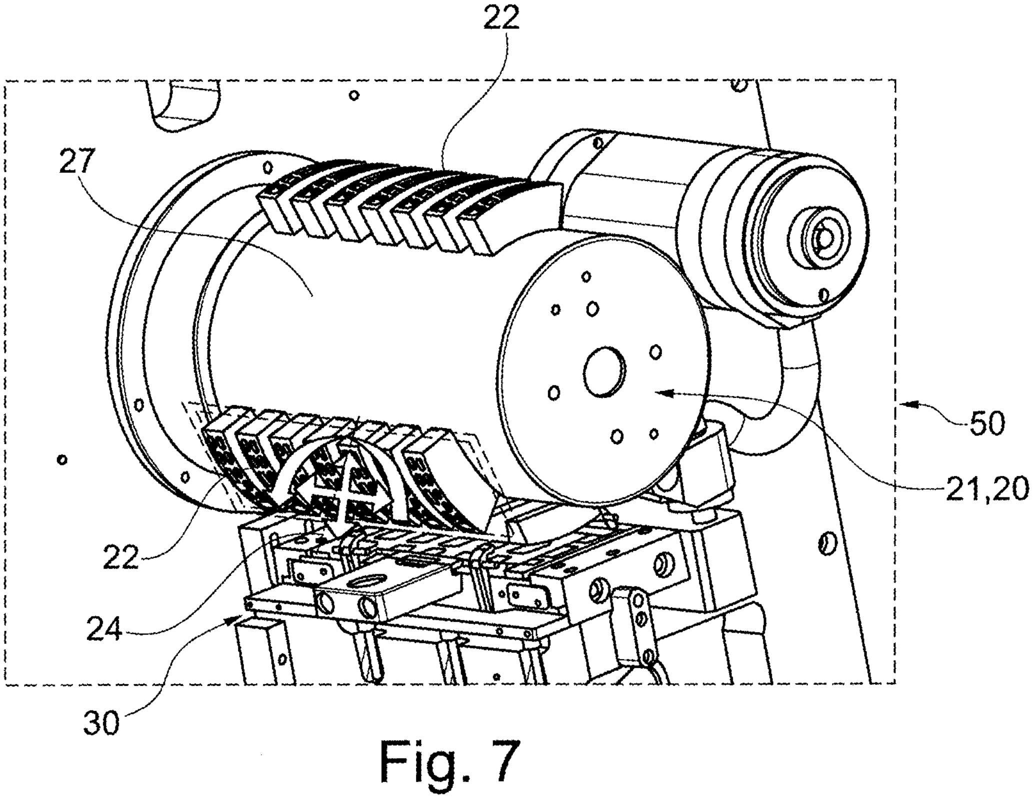

In the embodiment in accordance with FIG. 7, only the receptacles 22 of the conveyor device 20 are displaceable relative to a, for example, drum-shaped main body 27 of the conveyor device 20 along a transverse axis and/or along the conveying direction in order to compensate for an offset ΔS and/or ΔR of a flat element 95 along the transverse direction and/or along the conveying direction, and/or pivotable about a pivot axis 24 perpendicular to the conveying plane, for example about a radial axis of the rotary conveyor 21, in order to compensate for an angle offset φ of a flat element 95. For this purpose, the conveyor device 20 or the rotary conveyor 21 has a displacement and/or pivoting mechanism (not shown) which is controlled accordingly by the control/evaluation unit 40 in order to effect a displacement and/or pivoting of the respective receptacle 22.

In this embodiment, the receptacle 22 of the conveyor device 20 is therefore movably mounted and can be displaced in the conveying direction and/or in the transverse direction, and/or rotated in order to correct angle errors.

Figure 8:
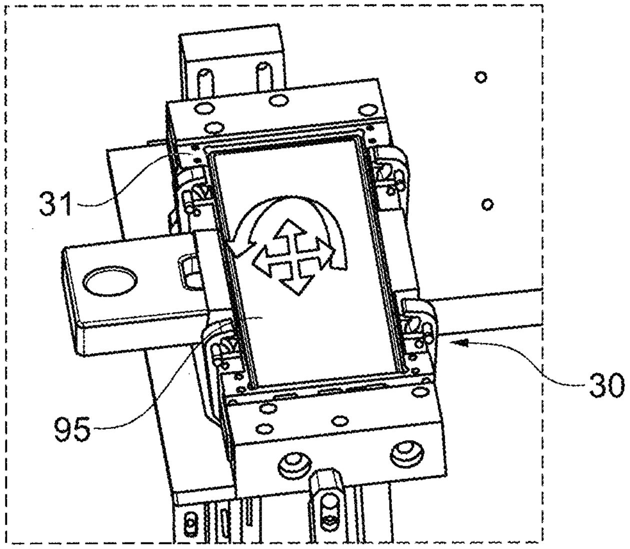
FIG. 8 is a perspective view of a stacking device in a further embodiment.

The stacking device 30 has an element receptacle 31, onto which the flat elements 95 delivered by the conveyor device 20 are placed on top of one another to form a segment stack and thus stacked. In the embodiment in accordance with FIG. 8, the element receptacle 31 of the stacking device 30 is displaceable along a transverse axis and/or along the conveying direction in order to compensate for an offset ΔS and/or ΔR of a flat element 95 lying thereon along the transverse direction and/or along the conveying direction, and/or pivotable about an axis of the rotary conveyor 21 perpendicular to the conveying plane, for example a vertical axis, in order to compensate for an angle offset φ of a flat element 95 lying thereon. For this purpose, the stacking device 30 has a displacement and/or pivoting mechanism (not shown) which is controlled accordingly by the control/evaluation unit 40 in order to effect a displacement and/or pivoting of the element receptacle 31. The element receptacle 31 can also be used to receive individual flat elements 31; the stacking process can then take place in a downstream stacking apparatus.

In this embodiment, the element receptacle 31, which can also be referred to as stack carrier, is therefore displaceable and/or rotatable in the plane. In order to prevent the individual flat elements of the stack from slipping against one another, they are preferably held or clamped with holding elements.

The previously described methods for position and/or angle correction can be used either individually or in any combination, possibly depending on which position and/or angle errors are present.

In another embodiment, an incorrectly positioned flat element 95 can be automatically removed from the product stream. A warning display on an operating terminal is also possible additionally or alternatively.

LIST OF REFERENCE SIGNS

10 Measuring device
11 Imaging measuring apparatus
12, 13 Optical contrast sensors
14-16 Optical sensors
20 Conveyor device
21 Rotary conveyor
22 Receptacle
23 Transverse axis
24 Pivot axis
25 Rotating body
26 Conveying means
27 Main body
30 Stacking device
31 Element receptacle
40 Control/evaluation unit
50 Stacking station

51, 52 Transverse edges
80, 81 Product streams
90 Electrode-separator composite unit
91 Separator sheet
92 Anode
93 Separator sheet
94 Cathode
95 Flat element
96 Contact tab

The invention claimed is:

1. A stacking station for a battery cell-producing industry, comprising a conveyor device for conveying flat elements and a stacking device arranged downstream of the conveyor device, wherein said stacking device receives flat elements delivered by the conveyor device, wherein the flat elements are placed on top of one another and are, thus, stacked to form a segment stack; wherein, as a flat element is being conveyed on the conveyor device, a position deviation ΔR, ΔS and/or an angle offset φ of the flat element is determined by image measurement or by measurement of optical contrast; wherein the conveyor device and/or the stacking device is designed to carry out a position and/or angle correction of the flat element on the basis of said image measurement or said measurement of optical contrast; and wherein, in order to carry out the position and/or angle correction, at least one element receptacle of the stacking device is adjustable and/or rotatable.

2. The stacking station in accordance with claim 1, wherein a correction of a position deviation ΔR of a flat element along the conveying direction F, R is carried out by controlled adjustment of the delivery position of the flat element from the conveyor device.

3. The stacking station in accordance with claim 2, wherein the controlled adjustment of the delivery position of the flat element from the conveyor device is carried out by driving the conveyor device in a position-controlled manner.

4. The stacking station in accordance with claim 1, wherein in order to carry out a position and/or angle correction of a flat element, a receptacle of the conveyor device for receiving a flat element is adjustable and/or rotatable relative to a main body of the conveyor device.

5. The stacking station in accordance with claim 1, wherein the conveyor device is a rotary conveyor having a rotating body, wherein the rotating body is displaceable as a whole along a transverse axis of rotation of the rotary conveyor in order to compensate for an offset of a flat element in a transverse direction, and/or pivotable about a pivot axis perpendicular to the conveying plane in order to compensate for an angle offset of a flat element.

6. The stacking station in accordance with claim 1, wherein the conveyor device is a rotary conveyor, wherein the stacking station comprises a control unit, wherein the control unit synchronises the imaging measuring apparatus such that images are captured at a time when the rotary conveyor is at a standstill.

7. The stacking station in accordance with claim 1, wherein the optical measuring device has a plurality of optical contrast sensors which are arranged transversely to a conveying direction of the conveyor device.

8. The stacking station in accordance with claim 1, wherein the optical measuring device has at least one laterally arranged optical sensor which is designed to detect a deviation ΔS of a position of a flat element being conveyed on the conveyor device from a target position in a transverse direction.

9. The stacking station in accordance with claim 1, wherein the conveyor device is arranged immediately upstream of the stacking device.

10. The stacking station in accordance with claim 1, wherein the conveyor device is a rotary conveyor.

* * * * *